Feb. 6, 1968 — W. J. MANSKE — 3,367,149
RADIANT WHITE LIGHT SOURCE
Original Filed Jan. 21, 1964 — 2 Sheets-Sheet 1
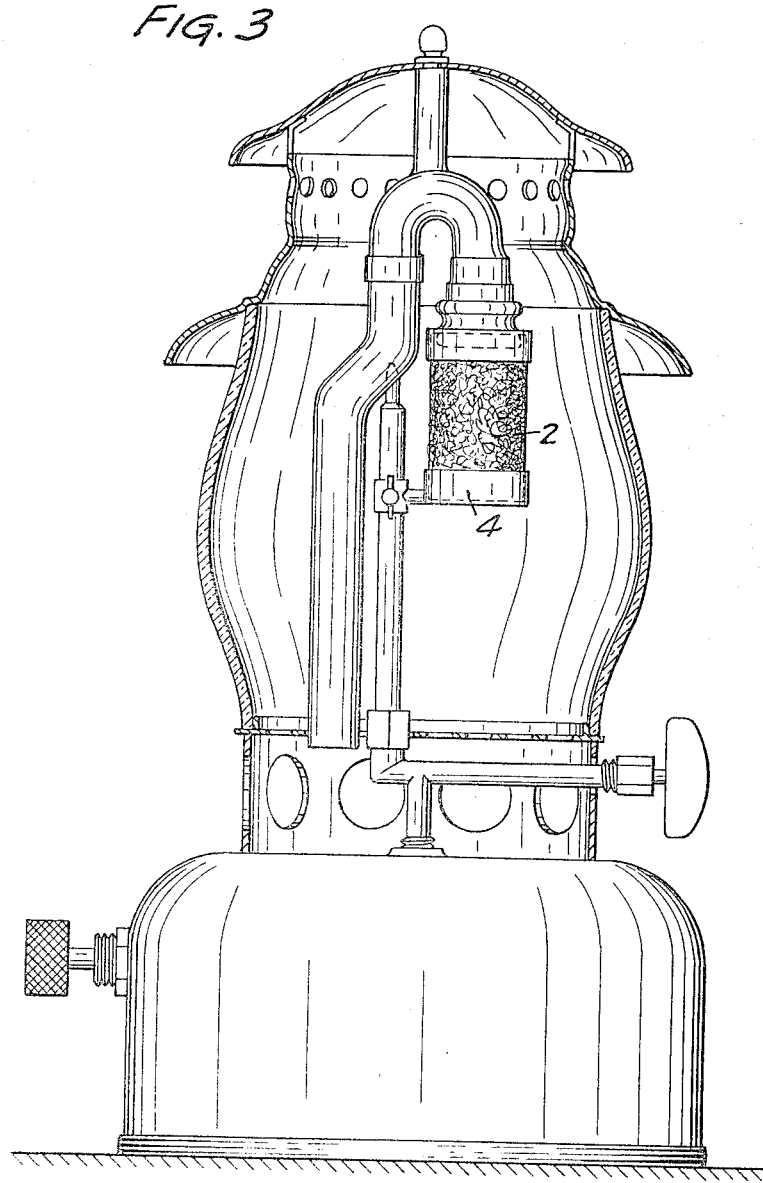
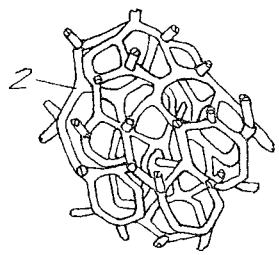
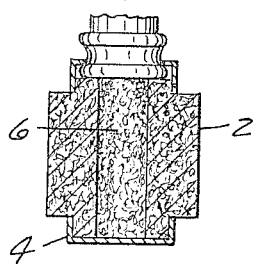
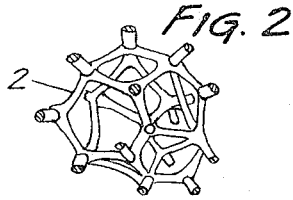
INVENTOR.
WENDELL J. MANSKE
BY
Carpenter, Abbott, Coulter & Kinney
ATTORNEYS

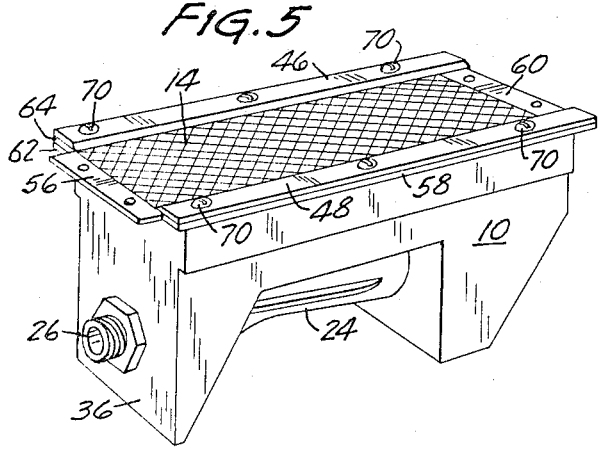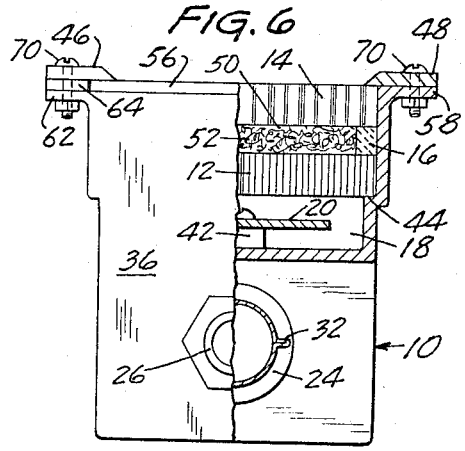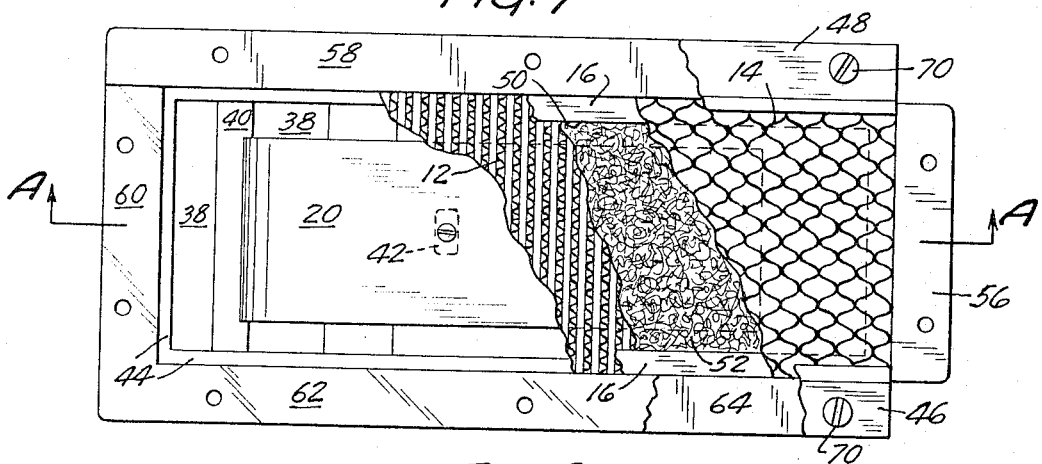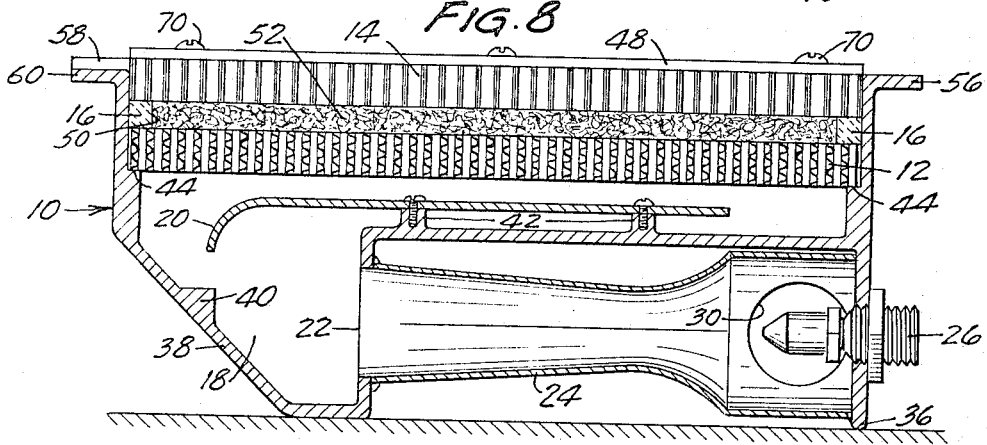

United States Patent Office 3,367,149
Patented Feb. 6, 1968

3,367,149
RADIANT WHITE LIGHT SOURCE
Wendell J. Manske, Birchwood, Minn., assignor to Minnesota Mining and Manufacturing Company, St. Paul, Minn., a corporation of Delaware
Continuation of application Ser. No. 339,220, Jan. 21, 1964. This application Dec. 15, 1966, Ser. No. 602,106
8 Claims. (Cl. 67—98)

ABSTRACT OF THE DISCLOSURE

A three-dimensionally reticulated structure of thoria and ceria is provided which has relatively low bulk density and is so open as to give relatively low resistance to gas flow therethrough. It is structurally relatively strong and is included in gas lights, lanterns, heaters, etc. The structures before firing or after firing and lacquering are convenient forms for shipment.

---

This application is a continuation of application Serial Number 339,220, filed January 21, 1964, now abandoned.

This invention relates to luminescent structures and to apparatus adapted to employing said luminescent structures for the product of light.

Luminosity is associated with high temperatures, and in fact it is common practice to designate temperatures roughly by reference to the color of light emitted, e.g. dull red heat about 550° C., white heat about 1400° C. and the like. It will also be recognized that flames may be luminous as the result of incandescent particles formed in the flame. If such particles are so cool as to resist complete oxidation they will ultimately collect as soot. Such luminous flames thereefore have a serious disadvantage. Furthermore, as is well known, the intensity of illumination achieved by such flames is very restricted.

Several approaches have been made to producing illumination of high intensity. Sodium and mercury lamps are illustrative of intense lights having characteristic colors. The most successful intense light sources have been incandescent solids, for example, electrically heated filaments or phosphors and heateed refractories.

Many refractories have been used with greater or less success and many others have been found to be useless. It is an interesting fact that usual refractories comprise oxides of elements occurring in approximately the lower half of the periodic table although among the metals the most refractory, e.g. platinum, tantalum, tungsten, occur in approximately the upper half of that table. Thorium oxide in the upper half of the table, which because of its remoteness is quite unlike the oxides of the lower half of the table, is however useful in luminescent structures and is highly refractory. It has long been known that the incorporation of 1 perceent of ceria in thoria gives structures which become highly luminous when heated to temperatures of the order of about 1700 to about 3000° C. The luminosity may be excited by a very hot flame (about 2500 to 3000° C.) impinging on the surface of a mass of thoria containing 1 percent of ceria or by a gas flame about (1700 to 2200° C.) of suitable shape playing on a refractory replicate of similar composition of a woven or knitted fabric. The latter are well-known generically as Welsbach mantles and are employed in various lighting devices. So far as is known the former type of device (i.e. masses of thoria) is not currently used or is at least not usually used and has neevr been generally used.

Each of these types of lighting apparatus offers decided disadvantages. In the case of the former, for example, the most satisfactory from the standpoint of intensity of light are those in which a blow-torch flame is employed which gives temperatures up to about 3000° C. using very cumbersome supplies of gas under augmented pressures. In the case of the Welsbach mantle type, the refractory replicate or ash is extremely fragile and is subject to destruction or damage by almost any accidental jarring, continued vibration or even stray breezes. Although not too costly or difficult to replace, the labor of replacement can be inconvenient and when performed as an item of maintenance is rather costly. These replicates of fabrics moreover are essentially two dimensional and have only about enough strength to hang suspended after burning off the fibrous organic support or the collodion fixative employed with preburned structures. They do not have sufficient strength to be employed in other positions than vertical such as at angles or disposed horizontally. Extensive discussions of the problems encountered with mantles and gas lights are provided by R. J. Zielinski, Gas Light Performance and Design, Research Bulletin 91 of the American Gas Association Laboratories, July, 1962 and D. Mc A. Mason, S. A. Weil and J. M. Reid, Investigation of Factors Affecting Gas Mantle Life, Inst. of Gas Technology Technical Rept. No. 6, December 1962.

For some purposes, such as in outdoor cafes, waiting stalls at bus stops and at outdoor sporting events particularly in cold weather, combinations of luminous sources and radiant heating sources would be very welcome.

Both natural and artificial combustible gases have heretofore been used both for heating and illumination. In general heat has been obtained by burning the gas either as individual or multiple flames and thereafter either permitting hot products of the combustion to circulate directly or to heat a further air stream not contaminated by oxidation products which is then circulated. In equipment intended for direct circulation of hot gases from the combustion some effort has been made to employ radiant heat to effect warming, for example, in old-fashioned fireplaces, but because of the relatively low temperatures atainable in the radiating portions of the structure, i.e., of the order of dull red heat or less, the efficiency has been rather poor. In such heaters heat is only effective within a small arc fairly close to the source. Particularly if radiant heat is to be employed outside of enclosed spaces, i.e. out-of-doors, effectiveness at greater distances is desirable. Thus a burner in a canopy should be sufficient to provide comfortable warmth to persons seated at 6–20 feet away without the unpleasantness or possible hazard or confining the products of combustion to the occupied area. Desirably illumination should be provided together with the heat.

It is one object of this invention to provide self-supporting luminescent structures.

Another object of this invention is to provide a structure adapted to give high luminosity when subjected to sufficiently elevated temperatures.

Yet another object of this invention is to provide luminescent structures of improved mechanical strength.

It is another object of this invention to provide radiant heaters operating at temperatures above about 1700° F.

A further object of this invention is to provide a source simultaneously radiating heat and light in amounts sufficient to provide comfort and visibility.

Additional objects of the invention will become apparent from the disclosure hereinafter.

In accordance with the above and other objects of the invention, it has been found that three dimensionally reticulated refractories of particular types, as will become clear hereinafter, may be incorporated in the combustion zone of a burner in which there is substantially non-luminous combustion. In one embodiment of the invention a reticulated refractory is placed in the combustion zone between channelled ceramic grids of different porosity to achieve both illumination and unusually efficient radiation of the heat as a result of the reverberatory burning and high temperatures achieved. Natural or artificial gas may be employed equally well making allowance for the different amounts of air necessary. The air is entirely mixed with the gas before combustion and no supplementary air is supplied or need be made available. It is found further that in another embodiment of the invention a three dimensionally reticulated refractory is made in a free-standing shape and is then employed in a non-luminous flame without reinforcing support.

It is found that a highly porous ceramic structure may be made from thoria which overcomes many of the disadvantages of the prior art. The structure may be broadly described as a self-supporting open reticulate refractory consisting substantially of thorium oxide and containing up to about 1 percent by weight of cerium oxide as emitter. The bulk density of these structures is in the range of about 5 to about 20 pounds per cubic foot. The reticulate structure may have any desired thickness, however, for use in illuminators thicknesses sufficient to achieve at least about 40 percent of optical opacity but not sufficient to impede gas flow are most satisfactory. The structure may also be termed an essentially rigid sponge-like mass. The desirable range of pore sizes is from about 1 to about 3 mm. in average diameter. The thickness is thus about twice the average pore size and ranges upward to about 10 times the average pore size. This range assures a three dimensionally reticulate structure which possesses surprising mechanical strength, sufficient optical opacity and yet has sufficient gas permeability that the position of the combustion zone is not materially altered by affecting the gas flow characteristics of the burner, for example, by promoting strike-back.

A particular advantage of the reticulate structures of the invention is that interlocking of filaments as in knitted structures is not necessary for support and in fact rarely occurs. The filaments or strands are therefore not subjected to transverse stresses in the weak direction where one bears on another but applied forces are translated vectorially to a considerable extent to compressional forces.

It is preferred that the reticulate structures of the invention contain from about 0.1 to about 0.5 percent of ceria. It will be seen that the preferred compositions of the invention contain considerably less ceria than the 1 percent which has heretofore been considered necessary both in filamentous mantles and in solid massive materials (for example), Kirk-Othmer, Dictionary of Chemical Technology, vol. 8, page 193. Amounts of ceria up to about 1 percent are usefully employed in the structures of the invention but amounts higher than 0.5 percent give measurably less light under the same conditions of heat input and the light is also visibly yellow in color. As the amount of ceria is decreased below 0.1 percent the intensity of luminescence decreases somewhat but the light is of good color. Thoria and thorium salts are available commercially usually contain small amounts of ceria, i.e., from about 0.0001 to 0.1 percent, which are sufficient to produce useful light and are deemed to be within the limit of about 0.1 percent. It appears that these low concentrations of from about 0.1 to about 0.5 percent of ceria are peculiarly useful in the reticulated refractories of the invention.

A particularly convenient method for making the luminescent structures of the invention is to apply a limited amount of a slip of thoria with suitable additions of ceria or cerium compounds to a three-dimensionally reticulate organic structure and thereafter destroy the organic matter by burning. The luminescent structure is thus a replicate cast having hollow interconnecting strands corresponding to the original organic reticulum. The amount of slip is limited to about sufficient to coat the structure without bridging passageways. A suitable organic reticulum is provided by a leached organic sponge of the polyurethane type and preferably one having from about 10 to 25 pores per inch, that is diameters of about 1 to 3 mm. Such sponges are available commercially under the tradename Scott Industrial Foam from Scott Paper Company. These open-pored synthetic organic reticula are particularly suitable because they are substantially free from ash which might lower the melting point of the refractory by fluxing with the thoria and/or ceria and which further might undesirably decrease the luminosity of the structures of the invention.

A slip which is particularly adapted to the coating of the organic reticulum is composed of finely divided thoria with a polymeric binder or thickener dissolved in suitable organic solvents. The vehicle of the slip must be viscous because of the density of thoria. Thoria, i.e., thorium oxide is employed in preference to pyrolyzable salts of thorium because it provides a more compact structure after firing.

The cerium is conveniently added in the form of a readily dispersible or soluble pyrolyzable salt and mixed thoroughly to give uniformity to the refractory structures. The double salt of cerium and ammonium nitrate is illustrative of such pyrolyzable salts. Water alone is found to be generally unsuitable for the suspension of such a dense solid although it is generally used for slips of the less dense oxides of the more usual types, i.e., of elements of the lower half of the periodic table. Generally a thicker, more viscous vehicle than water is necessary for slips of thoria. Many polymeric materials dissolved in suitable solvents including water may be used. One vehicle which has been found to be very suitable is a solution of a tetrapolymer of cyclohexyl acrylate, octadecyl acrylate, acrylonitrile, and acrylic acid (35, 30, 30 and 5 percents by weight respectively) in a mixture (parts by weight) of 38.5 parts of nitroethane, 23 parts of ethyl acetate and 38.5 parts of Cellosolve acetate. About 77.5 parts by weight of finely divided dry pure thorium oxide and 0.08 to 0.77 part by weight of cerium oxide (conveniently added as about 3 times the weight of cerium ammonium nitrate) are suspended in sufficient amounts of the above solution (at 13.5 percent by weight solids content) to give 100 parts. Mixing may be conveniently achieved by ball-milling which also further subdivides the particles of thoria.

Other vehicles are available from solutions of polymers of other classes which give flexible films on drying including, for example, polyurethanes (available under the designation Estane 5740X2 from B. F. Goodrich Chemical Co.), copolymers of acrylonitrile, butadiene and styrene, polyvinyl-butyral resin (available under the designation Butvar B–76 from Shawinigan Chemical Co.) and the like soluble flexible polymers. The slip is prepared to contain from about 55 to 85 percent by weight of inorganic materials (mostly thoria). At concentrations below that range there tends to be excessively rapid settling and at higher concentrations the consistency is too thick to permit of adequate milling, etc.

The organic reticulum is cut to the desired final shape and is then immersed in the thoria-ceria slip and then squeezed so that the up-take is sufficient to provide complete coverage of all foam surfaces. Sufficiency of the coating is conveniently and readily determined by employing a colored organic reticulum such as green or black and applying sufficient slip to hide the color of the organic reticulum. Inasmuch as the slip is essentially a white paint with good hiding power it readily obscures the color of the organic reticulum when applied in sufficient amount. Coating weights are controlled by slip viscosity which is adjusted from a high viscosity (ca. 20,000 cps.) downward to lower viscosities (ca. 2500 cps. minimum) by addition of small amounts of solvent. Because the slip tends to be film-forming, a current of air is blown on the impregnated reticulum and substatnially destroys films of slip which tend to block passageways. The impregnated reticulum is dried to remove all solvents complete coverage of all foam surfaces. Sufficiently of the coating is conveniently and readily determined by employing a of the reticulum. The green, unfired reticulum may be shaped and pieces cemented together employing small amounts of the slip if desired.

The green structure of the desired shape is fired at a temperature of about 1500° C. or higher to remove organic residues including the basic organic reticulum or open sponge as well as the polymeric residue of the vehicle and also effect coherence of the particles of thoria. It is advantageous to burn the structure in a kiln to a temperature sufficient to sinter the thoria but this is not essential. The structure can be placed directly in the combustion zone of the burner in which it is to be used and fired there. Continued use results in gradual sintering and enhanced coherence of the thoria. The structure may be strengthened for shipment by coating with collodion or other flammable binder as is done with the more conventional types of mantles.

In one embodiment of the invention a thoria-ceria reticulum as described above is employed in a burner having a combustion chamber defined on the inner side; i.e. the side from which the gas and air mixture enters, by a first channelled ceramic grid having a multiplicity of thin walled passages constituting about 30 percent of free space and defined on the outer side by a second channelled ceramic grid having a second multiplicity of thin-walled passages and about 85 percent of free space. The total of openings through the inner grid is thus considerably less, of the order of 25 to 50 percent of the openings through the outer grid.

In this construction the outer grid is of a thickness of about 7½ times the orifices of the inner grid and the inner grid is of about 10 times the thickness of the orifices therein. The grids are retained in spaced apart relation providing a combustion chamber. The edges of the combustion chamber are suitably defined by ceramic spacers. This burner is employed by inserting a thoria-ceria reticulum of the invention in the combustion chamber, preferably out of contact with the outer grid, and provides both radiant heat and illumination. The exact color of the light depends on the temperature attained in the reticulum and may be from bright red to yellow to intense white.

Insertion of luminescent structure in the combustion space as noted provides an excellent panel light source. The high temperatures achieved readily give a warm yellowish to white light which is very pleasant. No more than up to about one or two percent of the energy input is converted to light and there is radiation in the infrared by the luminescent structures of the invention so that there is provided a valuable source of both radiant heat and light. These luminescent structures are particularly convenient because they are not subject to loss of luminosity due to shifts in the point of combustion as are conventional essentially two dimensional structures such as Welsbach mantles. For the purposes of use in radiant burners as described above it is preferred to employ a reticulum having a thickness of at least about one half of the thickness of the combustion space and having greater included free space than the outer ceramic grid to avoid impeding gas flow.

The invention has been described broadly and it is now more particularly described with respect to the accompanying drawings wherein:

FIGURE 1 is a much enlarged diagrammatic representation of a three dimensional reticulum of the invention.

FIGURE 2 is a greatly enlarged diagrammatic represensation of a single pore or cell of a three dimensional reticulum of the invention.

FIGURE 3 is a lantern incorporating a luminescent source of the invention.

FIGURE 4 is a detail drawing in cross-section of a luminescent source for the lantern shown in FIGURE 3 having heavier walls and larger central channel.

FIGURE 5 is a perspective view of a complete unit of a combination radiant heater and light source incorporating the reticulate luminescent source of the invention.

FIGURE 6 is an end view of a combination radiant heater and light source of FIGURE 5 partially cut away to show the luminescent source.

FIGURE 7 is a view of a combination radiant burner and light source of FIGURE 5 broken away to show details of construction.

FIGURE 8 is a cross-sectional view along the line A—A of FIGURE 7 of a combination radiant burner and light source of FIGURE 5, the luminescent source being omitted to better show the combustion chamber and the venturi tube means for supplying combustible air-gas mixture being in elevation.

Referring now to the figures.

FIGURE 1 is an enlarged diagrammatic representation of a three dimensional reticulum showing that interconnections are at various angles and levels and also showing the porous and open nature of structures of the invention. Depending upon the thickness of coating with slip of thoria employed as described hereinelsewhere, the points of interconnection of the various strands will be enlarged to provide effective reinforcement at those points as a result of the filletting action of the slip.

FIGURE 2 is a greatly enlarged diagrammatic representation of a single port of a three dimensional reticulum of the invention which particularly illustrates such a pore when the structure is derived from a leached organic sponge as hereinelsewhere described. It will be seen from FIGURES 1 and 2 that the individual interconnected strands define the edges of irregular open polyhedra of usually ten or more and up to about twenty faces. Most of each polyhedron will be seen to be open so that these structures are composed of contiguous skeletal open polyhedra. Although it cannot be shown satisfactorily in a drawing, even in the considerable enlargement of FIGURE 2, when the structure is formed by the burning out of an organic reticulum as described the individual strands and the points of interconnection, or nodes, are somewhat hollow and the structure is a replicate cast of the organic reticulum.

FIGURE 3 shows a lantern of essentially conventional design, and is hence not detailed. Luminescent structure 2 of the invention, supported by support 4 has a central channel 6. The gas and air mixture is supplied at the top to the central channel and is burned. The zone of combustion adapts itself to prevailing conditions and heats the luminescent structure to incandescence.

FIGURE 4 shows a luminescent source of somewhat enlarged diameter which will be seen to be made smaller at the ends so that it is received by supports as shown in FIGURE 3. Indicia are the same as in FIGURE 3.

Referring now to FIGURES 5 to 8 inclusive in which like parts bear the same reference numbers, it is seen that this embodiment of the invention comprises a burner casing 10 provided with inner channelled ceramic grid 12 and outer channelled ceramic grid 14 spaced apart by ceramic spacer bars 16, gas-mixture plenum-space 18 provided with distributor plate 20 and port 22 for admission of a combustible mixture of gas and air from Venturi tube 24 having gas inlet 26, orifice 28, air inlet port 30 and fin 32. It will be seen that burner casing 10 not only serves as a suport for grids 12 and 14 but also provides the combustible gas-mixture plenum 18 and is recessed to receive and serves as support for the means providing a combustible gas-air mixture, namely the Venturi assembly which is affixed to the casing at port 22 and also in leg 36 of the casing in the recess in the generally oblong casing.

Referring particularly to the gas-mixture plenum 18 as shown in FIGURE 8 it will be seen that the end 38, facing port 22, is inclined at an angle and is provided with a ledge 40. In operation the combustible gas-air mixture entering at port 22 is deflected by end 38 and passes around distributor plate 20 (supported in the casing by pedestals 42). Ledge 40 in cooperation with the curved end of plate 20 serves to constrict flow near the point of deflection so that the gas-air mixture is uniformly distributed throughout the plenum space and is incidentally further mixed.

The upper part of casing 10 is offset or rabbetted to provide a seat 44 on which inner grid 12 rests. Outer grid 14 is spaced away from inner grid 12 by peripherally placed ceramic spacer bars 16 providing combustion space 50. The respective ceramic pieces are retained against seat 44 by longitudinal retaining strips 46 and 48. The reticulated luminescent structure 52 is positioned within combustion space 50 in FIGURES 6 and 7 and is not shown in FIGURE 8 so that other detail of the structure is more easily seen.

It will be further seen that the upper portion of casing 10 is provided with flanges 56, 58, 60 and 62. These flanges are not continuous around the periphery of the casing but are arranged so that a plurality of similar burners can be assembled into a large panel. The upper surface of flange 56, which is seen to be an ear at one end of the casing, is approximately at the level of the upper surface of grid 14 and longitudinal flange 58, to which retaining strip 48 is fastened by bolts 70, is at the same relative level. From the figures it will be seen that flanges 60 and 62 are continuous around one end and one side of the case at a level below that of flanges 56 and 58 and retaining strip 46 is brought to the level of grid 14 by shim strip 64 which is of the same thickness as the flanges. When a plurality of units are assembled in side by side relationship flange 58 of one unit rests flange 62 of the adjacent unit in place of the shim strip and a retaining strip (not shown) operative on both sides, i.e. with two protruding edges is employed to retain the grids of the two adjacent units. Further when a plurality are assembled in end to end relationship flange 56 of one unit rests on and is bolted to flange 60 of the adjacent unit. In such relationship it will be seen that the inclined wall of the casing at 38 provides access to making connection to the gas inlet 26 of the adjacent unit.

In order to show the relative luminosities of three dimensionally reticulate structures of the invention, reticula are prepared using slips of thoria containing cerium ammonium nitrate in amounts to yield 0.2 and 1.0 percent of ceria after ignition and designated reticula A and B, respectively. The vehicle in each case is the tetrapolymer solution described hereinabove. Porous organic reticulate structures 0.25 inch thick having an average pore diameter of about 0.10 inch are coated with the respective slips and dried to give a green unfired reticulum. This provides, after firing, a reticulum of the invention having a bulk density of about 10.5 pounds per cubic foot. The crush strength of a fired reticulum having a bulk density of about 20 pounds per cubic foot is about 14 pounds per square inch when measured between resilient faces such that the load is well distributed throughout the specimen and it is thus outside the range of strengths necessary for building materials and the like.

One sheet of the green unfired reticulum of each concentration of ceria is cut to a size of 2¾ by 7¾ inches and fired in a kiln to about 1625° C. over a period of 7 hours to give a white to pale yellow reticulum of the invention. The two sheets, reticula A and B, are mounted in a burner of the construction shown in FIGURES 5 to 8 so that the luminosities of the reticula can be compared. A structure of refractory plates 2 inches wide by 4 inches high (white alumina) is erected near the center of the outer grid so that 2 inch square areas of each reticulum are outlined on either side of a common wall. The reticula are thus provided with substantially identical conditions and can be compared for luminosity under a series of conditions. The light emitted from the reticula is measured in arbitrary units using a commercial photographic exposure meter (Sekonic Studio Model-S made in Japan by the Sekonic Electric Co., Ltd.) and recorded, together with observations of visual differences in color or intensity of light at varying inputs of natural gas to the burner and varying amounts of primary air. The data are shown in the following table.

It will be seen that under all conditions except for mixtures in which there is such an excess of air that there is a cooling effect, reticulum A provides more light and is whiter in color.

In another example, which simulates a light of the type employed for outside illumination, e.g. yard or street light, reticula are prepared as above and cut and formed, using the same slip as cement where needed, into hollow oblate hemispherical shapes having an outside diameter of about 1.25 inches and height of about 1 inch. The walls are of about 0.25 inch thickness. The shapes having ceria concentrations respectively of 0.2 and 1.0 percent are designated A and B as above. The

| Gas Input (B.t.u./hr./in.$^2$) | Air Input (ft.$^3$/min.) | Luminosity (arbitrary units) | | Visual Observation |
|---|---|---|---|---|
| | | Reticulum A | Reticulum B | |
| 240 | 0.732 | 110 | 100 | A white yellow. B markedly yellow. |
| | 0.789 | 130 | 130 | |
| | 0.842 | 140 | 140 | |
| | 0.881 | 100 | 110 | Both deep yellow. |
| 290 | 0.790 | 130 | 115 | A yellow white. B yellow. |
| | 0.832 | 140 | 125 | |
| | 0.905 | 160 | 160 | |
| | 0.965 | 105 | 125 | Both deep yellow. |
| 300 | 0.789 | 160 | 130 | Blue tail showing too little air. |
| | 0.834 | 175 | 145 | |
| | 0.880 | 175 | 140 | A yellow white. B yellow. |
| | 0.934 | 150 | 150 | Both deep yellow. |
| | 1.000 | 175 | 185 | |
| 360 | 0.832 | 245 | 220 | Blue tail too little air. |
| | 0.909 | 250 | 240 | |
| | 0.968 | 250 | 240 | A yellow white. B yellow. |
| | 1.000 | 235 | 225 | |
| | 1.039 | 220 | 225 | Both deep yellow. |
| | 1.200 | 190 | 220 | | shapes are fired and are then employed in series of tests by placing each shape on the top of a Meker type gas burner surrounded by a refractory tile box 2 inches on a side and 4 inches high and open at the front and top. Readings of light intensity are made at a distance of one foot from the center of the shape at each of various gas inputs after adjusting the air to give maximum brightness. The data obtained for each shape are shown in the following table.

| Reticulum | Natural Gas Input (B.t.u./hr.) | Luminosity (arbitrary units) | Visual Observations |
|---|---|---|---|
| A | 2,300 | 16 | Dull yellow. |
|   | 3,100 | 75 |  |
|   | 3,800 | 120 | Yellow. |
|   | 5,720 | 200 | Yellow white. |
|   | 7,550 | 250 | Intense white light, too bright to look at directly. |
|   | 8,010 | 250 |  |
| B | 3,300 | 32 | Dull deep yellow. |
|   | 5,200 | 120 |  |
|   | 7,750 | 175 |  |
|   | 8,115 | 185 | Yellow light, easy to look at directly. |
|   | 8,500 | 185 |  |
|   | 8,500 | 185 |  |

It will be seen that although the heat input was raised to about the maximum possible with this type of burner, the reticulum having the higher content of ceria did not reach an intense white although providing a useful amount of light.

For purposes of comparison tests are run on a commercial Welsbach mantle (No. 8ME813, marked as made in England and available from the Welsbach Corp., Baltimore, Maryland) in a commercial gas burner at gas inputs of 1570 to 2200 B.t.u./hr. Higher input (2640 B.t.u./hr.) is obtained using a variable orifice. The burner is found to be very sensitive to exact air-gas ratio. The light is also easily quenched by stray air currents and must be protected by a glass shield. Maximum light intensity is achieved before recording results for each gas input rate. Luminosities are measured in the same arbitrary units at a distance of 1 foot, as above, against a white tile background. At gas inputs above 2640 B.t.u./hr. luminosity drops. The results are tabulated as shown below.

| Gas Pressure (in. water) | Gas Input (B.t.u./hr.) | Luminosity (arbitrary units) | Visual observations |
|---|---|---|---|
| 4.0 | 1,570 | 16 | Lower third yellow white upper two thirds dull yellow. |
| 5.0 | 1,780 | 26 |  |
| 6.0 | 2,020 | 28 | Lower half yellow white upper half dull yellow. |
| 6.9 | 2,200 | 32 |  |
| 6.8 | 2,640 | 64 | All yellow white. |

It is apparent that considerably more light is obtained from reticula of the invention. Additional significant advantages are the stability of the light, e.g. freedom from flickering and lack of sensitivity to exact adjustment of fuel mixture which may be altered accidentally by minute changes in orifice size, either from corrosion or plugging by particles in the gas line.

For purposes of comparison a smaller reticulum of the invention having the composition of reticulum A above is made in conoidal shape about 1 inch in diameter at the base and 7/8 inch high with walls 1/4 inch thick. It is found that this reticulum gives excellent and comparable luminosities at much lower fuel consumptions than those slightly larger ones described above. Curves of luminosity (in the same arbitrary units) at different pressure intersect at an input of about 2000 B.t.u. per hour which is in the desirable range for economical usage. The luminosity is then about 50 arbitrary units, that is roughly twice that of the much larger Welsbach mantles described above at approximately the same gas input. This further shows relative insensitivity to variations in fuel supply and greater lighting efficiency.

What is claimed is:

1. An article of manufacture adapted to become luminescent when heated consisting of an essentially rigid three dimensional reticulum having a bulk density in the range of from about 5 to about 20 pounds per cubic foot composed essentially of integrally interconnected relatively thin hollow strands of thermally coherent particles of thoria in combination with from about 0.1 to about 1 percent by weight of ceria.

2. An article according to claim 1 wherein the relatively thin hollow strands define the edges of open contiguous irregular polyhedra of from about 10 to 20 faces and of an average diameter from about 1 mm. to 3 mm.

3. An article according to claim 1 with means providing a zone of elevated temperature of the order of at least about 1000° C. and not more than about 3000° C., said article being positioned within said zone.

4. The combination of claim 3 wherein the means providing a zone of elevated temperature is a lantern structure in which the article is visible.

5. A combination gas-fired radiant heater and light source comprising in combination a generally parallelopipedal casing having one open face and having a recess adapted to receive air and gas-mixing means, a port within a wall of said recess for admission of a combustible air and gas mixture, means within said casing distributing said air and gas mixture substantially uniformly to said open face, a first channelled grid having from about 25–40 percent of open surface positioned within said open face and, spaced apart therefrom in said open face, a second channelled ceramic grid having from about 65 to 90 percent of open surface and, in the space between said first and second grids, at least one luminescent structure of integrally interconnected strands consisting essentially of thoria containing from about 0.1 to about 1 percent by weight of ceria, said interconnected strands defining the edges of contiguous open polyhedra having from about 10 to about 20 faces, said luminescent structures more than half filling the space between said first and second grids and having a minimum dimension of at least about twice the average diameter of said open polyhedra and sufficient open volume to offer substantially no more resistance to flow of gas therethrough than provided by said second channelled ceramic grid.

6. As an article of manufacture, an unfired green structure adapted to be fired to a three dimensional reticulum of integrally interconnected relatively thin hollow strands of thermally coherent particles of thoria in combination with ceria, said unfired green article consisting essentially of the combination of a pyrolyzable three dimensional organic reticulum defining edges of open contiguous irregular polyhedra and, completely covering and adherent to said organic reticulum and supported thereby, a composition consisting essentially of polymeric organic binder and about 55 to 85 percent by weight, determined as oxides, of a homogeneous dispersion of from about 0.1 to about 1 percent by weight of cerium compound in thorium compound.

7. The article of claim 6 wherein the organic reticulum is an open-celled leached polyurethane foam sponge and the polymeric organic binder is an acrylate polymer.

8. As an article of manufacture, an essentially rigid three dimensional reticulum composed essentially of integrally interconnected relatively thin strands of thermally coherent particles of thoria in combination with from about 0.1 to about 1 percent by weight of ceria further strengthened for shipment by coating with flammable temporary binder which binder is burned off when said article is first exposed to a flame in use.

References Cited

UNITED STATES PATENTS

| | | | |
|---|---|---|---|
| 949,010 | 2/1910 | Unruh | 252—492 |
| 996,182 | 6/1911 | Wiederhold | 252—492 |
| 1,256,301 | 2/1918 | Ellis | 158—99 |

(Other references on following page)

UNITED STATES PATENTS

| | | | |
|---|---|---|---|
| 1,993,778 | 3/1935 | Francis | 117—33.4 X |
| 2,546,115 | 3/1951 | Ulmer | 117—33.4 |
| 3,090,094 | 5/1963 | Schwartzwalder et al. | 264—44 |
| 3,097,930 | 7/1963 | Holland | 264—44 |
| 3,111,396 | 11/1963 | Ball. | |
| 3,208,247 | 9/1965 | Weil et al. | 158—116 |

FOREIGN PATENTS 753,786   8/1956   Great Britain.

JAMES W. WESTHAVER, Primary Examiner.

FREDERICK L. MATTESON, JR., Examiner.

H. B. RAMEY, Assistant Examiner.

UNITED STATES PATENT OFFICE
CERTIFICATE OF CORRECTION

Patent No. 3,367,149                              February 6, 1968

Wendell J. Manske

It is hereby certified that error appears in the above numbered patent requiring correction and that the said Letters Patent should read as corrected below.

Column 1, line 35, for "thereeforee" read -- therefore --; line 55, for "perceent" read -- percent --; column 5, line 9, for "substatnially" read -- substantially --; lines 11 to 14, strike out "solvents complete coverage of all foam surfaces. Sufficiently of the coating is conveniently and readily determined by employing a of the reticulum." and insert instead -- solvents completely. The polymeric binder helps to preserve the form of the reticulum. --; column 6, line 42, for "port" read -- pore --; column 7, line 5, for "suport" read -- support --.

Signed and sealed this 8th day of April 1969.

(SEAL)
Attest:

Edward M. Fletcher, Jr.                                    EDWARD J. BRENNER

Attesting Officer                                             Commissioner of Patents